UNITED STATES PATENT OFFICE.

ALBERT WILHELM REHNSTRÖM, OF MÄLHAMMAR, ASSIGNOR TO THE AKTIEBOLAGET LACTOSERIN, (LACTOSERIN COMPANY, LIMITED,) OF STOCKHOLM, SWEDEN.

PREPARING FOOD FROM MILK-CURD.

SPECIFICATION forming part of Letters Patent No. 446,887, dated February 24, 1891.

Application filed December 3, 1889. Serial No. 332,469. (No specimens.)

*To all whom it may concern:*

Be it known that I, ALBERT WILHELM REHNSTRÖM, a subject of the King of Sweden, residing at Mälhammar, Rekarne, in the Kingdom of Sweden, have invented a new Method for Preparing a Food Product Called Milk-Solidate, of which the following is a specification.

The present invention relates to the production of a substance that is suitable as food for people, as well as for cattle fed for producing milk or to be fattened, and other domestic animals, said substance being not only rich in nutritious ingredients, but also having salutary properties of high quality. As this food is very nitrogenous it is very nutritious, and because it also contains just those salts that form part of the different parts of the animal body, and, moreover, in the best proportions and in the form easiest to digest, the wholesomeness of this food must be evident.

The substance is prepared in the following manner: Milk free from acid is heated to a temperature suitable for adding common cheese-rennet and for effective precipitation—say, to about 30° or 37° centigrade—after which a necessary amount of rennet is added, so that a thorough coagulation is obtained. This being done, the coagulum is worked with a suitable tool until the white particles of caseine appear in small groups of the size of a pea, which, still in a gelatinous state, are allowed to sink to the bottom of the apparatus, when the working ceases. The whey, separated from the caseine, is now drawn off, but not to a greater extent than that the yellow-white mass is kept loose and gelatinous. All the whey obtained, or a part of it, is then rapidly heated to boiling and evaporated to about two-thirds of its volume, when the beaten gelatinous mass is added to the concentrated whey and the evaporation continued, while the mass is being stirred to prevent burning, either until it becomes thick, when it is further evaporated to dryness in a special drying apparatus at about 100° centigrade, or the evaporation to dryness is allowed to proceed in the first-mentioned evaporating-vessel. Milk that has become more or less sour is treated in the same manner, the only difference being that the rennet for obtaining coagulation in this case is not wanted, as this process has already taken place through the action of the lactic acid. On the other hand, the heating-temperature ought to be raised to about 40° or 50° centigrade, the separated caseine being by the use of such milk a little harder. When using sour milk, the acid in the warm sour whey ought to be neutralized as soon as the caseine is separated. A suitable matter for this purpose is common white caustic lime. It is not necessary, however, to completely satiate the lactic acid, but only to such a degree that the greater part of the lactic acid becomes bound and formed into calcium lactate. The dry mass obtained is used in the preparation of fodder-cakes, which then constitute a good strong fodder for ruminant domestic animals.

The dry mass obtained is pulverized, and is ready for use, first, when the substance is prepared from milk free from acid as an ingredient in food for people; second, when the substance is prepared from milk free from acid or sour milk as an ingredient in food for domestic animals, and then as an addition in cakes of strong fodder or other form of mixed fodder, and also as an ingredient in bread for animals, or dissolved in water or other suitable fluid to a liquid food. When the strong fodder is intended for ruminants in places low in limy matter and lime has not been added before, as when sour milk is the constituent part in the substance, it is always advisable to add some calcium salts to the substance in order to strengthen the skeleton of the animals that are fed with this food. An excellent ingredient for this purpose is very finely-pulverized calcium phosphate.

Having now described my invention, what I claim, and desire to secure by Letters Patent, is—

The mode of preparing a food or ingredients in food for people or domestic animals, consisting in separating milk by coagulation into its constituents—caseine and whey—then evaporating a greater or smaller part of this whey separately, and when reduced in volume adding and mixing the same well with the caseine that is kept in readiness, and, finally, during continued evaporation reducing the whole to dryness and into a pulverized form, substantially as described.

In witness whereof I have hereunto signed my name in the presence of two subscribing witnesses.

ALBERT WILHELM REHNSTRÖM.

Witnesses:
　NERE A. ELFWING,
　ERNST SVANGVIST.